R. C. HULL.
SYSTEM OF ELECTRICAL DISTRIBUTION.
APPLICATION FILED MAR. 18, 1910.

1,014,395.

Patented Jan. 9, 1912.

Inventor
Robert C. Hull 1,014,395.

SYSTEM OF ELECTRICAL DISTRIBUTION.
APPLICATION FILED MAR. 18, 1910.

Patented Jan. 9, 1912.
2 SHEETS—SHEET 2.

Inventor
Robert C. Hull

Witnesses
J. Lester Woodbridge
Joseph H. Tracy

UNITED STATES PATENT OFFICE.

ROBERT C. HULL, OF PHILADELPHIA, PENNSYLVANIA.

SYSTEM OF ELECTRICAL DISTRIBUTION.

1,014,395.     Specification of Letters Patent.     Patented Jan. 9, 1912.

Application filed March 18, 1910. Serial No. 550,163.

*To all whom it may concern:*

Be it known that I, ROBERT C. HULL, a citizen of the United States, and residing in the city of Philadelphia, State of Pennsylvania, have invented certain new and useful Improvements in Systems of Electrical Distribution, of which the following is a specification.

My invention relates to those systems of distribution in which a dynamo electric machine is driven at a variable speed, as for example, by the axle of a moving vehicle or by a wind mill, and supplies current to translating devices requiring a constant potential.

My invention applies more especially to systems such as described in patent application #507,316 filed July 13th, 1909 by J. Lester Woodbridge and myself jointly, and comprises improvements in the means for providing the primary excitation for the generator fields whereby the construction and windings on these fields is made less expensive. In the application cited above, the primary excitation is produced by two opposing field windings, one of which is supplied with a substantially constant current while the current in the other varies with the voltage of the circuit to be regulated. The primary excitation is the resultant of the difference between these two windings and is a small percentage of the effect which either one alone will produce. It is, therefore, necessary to provide a considerable excess of field winding above that actually necessary to produce the primary excitation. In the present invention, I provide means whereby this excess of field winding is obviated, a single winding only being required for the primary excitation, the current in which is reduced to zero by a special arrangement of circuits and devices when the voltage on the work circuit reaches its limiting value. This latter voltage can, therefore, never reach this limiting value.

Figure 1:
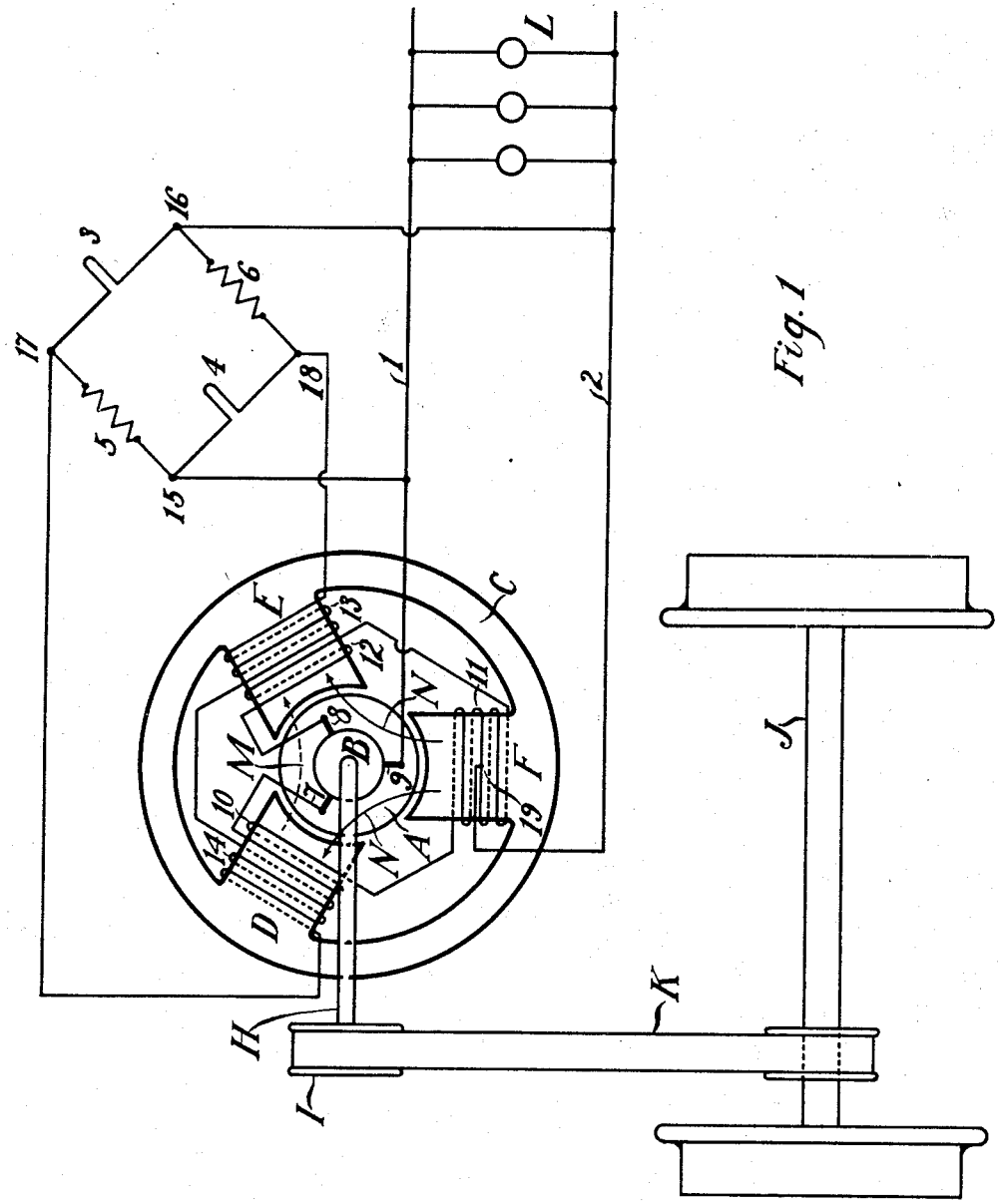
Figure 2:
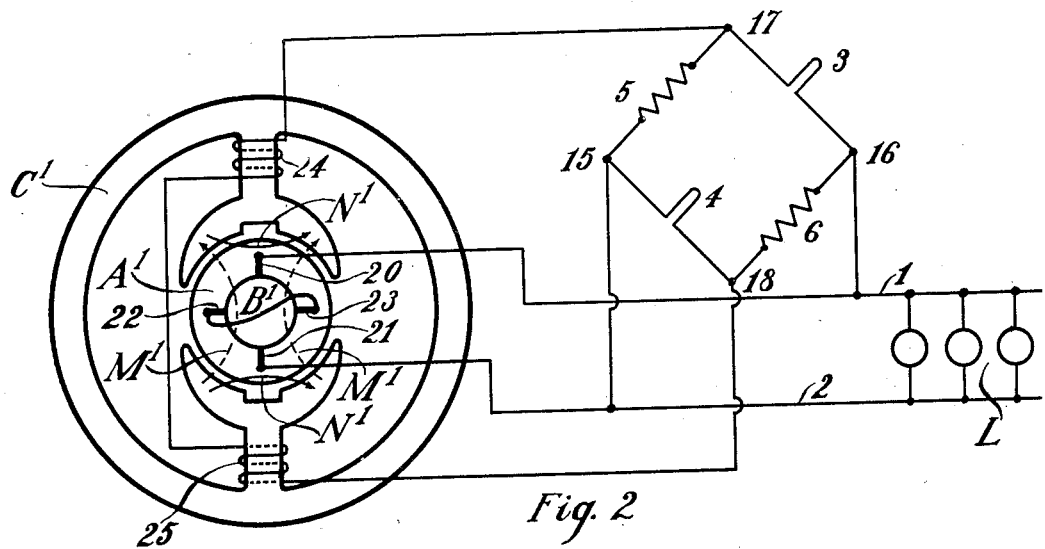
Figure 3:
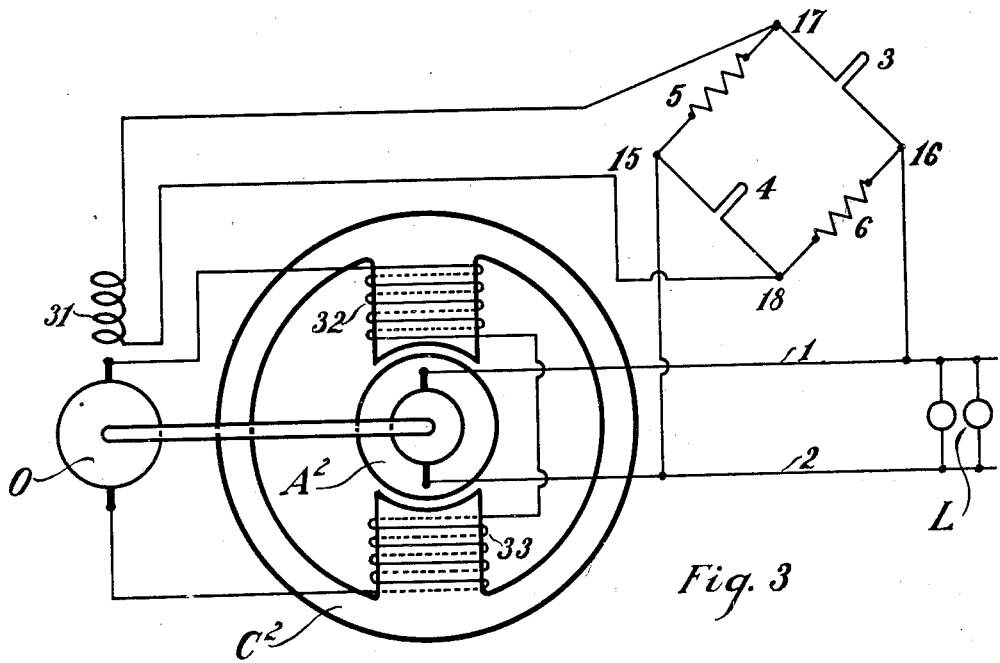

In the accompanying drawings, Figure 1 shows one embodiment of my invention applied to a generator of the three pole type, while Fig. 2 shows the same arrangement applied to another type of generator, and Fig. 3 shows the same arrangement applied to the exciter of a standard generator.

Referring to Fig. 1, A is the armature and B the commutator of a generator whose field frame is shown at C, this latter being provided with three internally projecting poles, D, E and F. The armature is driven at a variable speed by belting its pulley I to the axle J of a moving vehicle, such as a railway car. Three brushes 7—8—9 bear upon the commutator B at equidistant points, and the armature is so wound that the potential between each pair of brushes is fixed by the algebraic sum of the magnetic flux in the corresponding pair of poles. The construction of such a machine is fully described in Patent No. 895824 to J. L. Woodbridge, August 11th, 1908. The primary excitation of this machine is produced by the field winding 13—14 on the poles E and D respectively. This winding produces a flux in the direction of the arrow M. This flux produces a difference of potential between the brushes 7—8. The secondary excitation is produced by field windings 10 11—12, which are connected in series across the brushes 7—8. These windings produce a flux in the direction of the arrows N N. This flux will produce a voltage between the brushes 8 and 9, and the same voltage between the brushes 7 and 9. So far as the flux represented by the arrows N N is concerned there will be no difference in voltage between the brushes 7 and 8, whatever difference exists between these brushes being produced by the flux represented by the arrow M. The brush 9 constitutes one of the main terminals of the machine while a point 19 in the field circuit 10—11—12 midway between the brushes 7 and 8 constitutes the other main terminal of the machine. These two terminals are connected to the circuit 1—2 which supplies the load L. The primary windings 13—14 are connected to the points 17 and 18 of a Wheatstone bridge, the other junction points of the bridge 15, 16 being connected respectively to the conductors 1, 2. The Wheatstone bridge comprises two resistances, 5 and 6, having a practically zero temperature coefficient, located in two opposing legs and two high temperature co-efficient resistances, 3 and 4 located in the other two opposite legs. These last two resistances may be of the well known hot iron wire type whose resistance increases very rapidly with very small increments of current between certain limits so that over a considerable range of applied voltage across their terminals the flow of current remains substantially constant. The voltage at which these are most sensitive should be chosen at about half of the voltage desired across the circuit 1—2. If, now the resistances 5 and 6 be so designed that with a current flowing through them equivalent to the constant current for which the resistances 3 and 4 are designed, the drop in voltage across the resistances 5 and 6 will be just half of the desired limiting voltage across the circuit 1—2, then at this limiting voltage there will be no difference of potential between the points 17 and 18 and no current will flow through the primary field winding 13 and 14. It is evident that under these conditions the voltage across the circuit 1—2 can never quite reach the limiting voltage since at this voltage the excitation of the dynamo would be zero. With a slightly lower voltage than this, current will flow through the field winding 13 and 14 producing the flux represented by the arrow M, which in turn will develop a voltage across the brushes 7 and 8, and a flow of current in the field windings 10, 11 and 12 to produce the voltage across the circuit 1—2. By properly designing the various parts of this apparatus, a very small reduction in voltage across the circuit 1—2 below the limiting voltage will produce sufficient excitation to maintain this slightly reduced voltage at the lowest desired speed of the axle J. For all speeds above this the voltage will have a value between this minimum and the limiting value. The difference between these two limits may be made so small as to be negligible, and the machine will have a practically constant voltage for all speeds above the critical speed selected as a minimum.

The combination shown in Fig. 2 includes the same arrangement of Wheatstone bridge but a different type of generator. This generator comprises an armature $A^1$ having a commutator $B^1$ rotating in the field frame $C^1$ which is provided with two internally projecting poles of peculiar shape arranged to provide for two sets of magnetic lines. One of these represented by the arrows $M^1$ is produced by the primary excitation due to the windings 24 and 25 wound on the neck of each pole piece. These windings are connected across the points 17 and 18 of the Wheatstone bridge as in Fig. 1. Two pair of brushes bear on the commutator $B^1$ of which one pair 22 and 23 are located at points of potential difference due to the flux $M^1$. These brushes are short-circuited. A small amount of flux in the direction of the arrows $M^1$ will produce a considerable flow of current through the short-circuit, thereby giving rise to a magneto-motive force in the armature winding which will produce the secondary flux represented by the arrows $N^1$. This latter flux will produce the voltage across the main terminals of the machine at the other pair of brushes 20 and 21 which are connected to the circuit 1—2.

As described in connection with Fig. 1 there will be a certain limiting voltage across the circuit 1—2 at which the Wheatstone bridge will be exactly balanced and there will be no flow of current through the windings 24—25, so that the voltage across the circuit 1—2 can never quite reach this limit. In Fig. 3 the same arrangement of Wheatstone bridge is shown, to which is connected the field winding 31 of an exciter O mounted on the shaft of the armature $A^2$ of the generator. The exciter supplies current to the field windings 32 and 33 of the generator in the usual manner. As explained in connection with the previous figures there will be a voltage across the circuit 1—2 at which the Wheatstone bridge will be exactly balanced and no current will flow through the field winding 31 of the exciter, while with a voltage slightly below this limit a sufficient flow of current will pass through the winding 31 to develop a voltage in the exciter O suitable for exciting the windings 32 and 33 of the main machine to maintain the said voltage across the circuit 1—2 at the minimum speed of operation.

What I claim and desire to secure by Letters Patent is,

In combination, a dynamo electric machine having an armature and its commutator and a field structure providing paths for two sets of magnetic lines, constituting a primary and a secondary magnetic flux displaced from each other whereof the path for the primary flux is in part distinct from the path for the secondary flux, one pair of brushes bearing upon the armature at points of potential difference due to the primary flux, a conducting circuit of low resistance connecting said brushes, a second pair of brushes bearing upon the armature at points of potential difference due to the secondary flux, a consumption circuit connected to said second pair of brushes, a Wheatstone bridge including resistances having different temperature coefficients, connections from two opposite junction points of said bridge to the consumption circuit, and a field winding on that part of the path for the primary flux which is distinct from the other path, said winding connected across the other two opposite junction points of the bridge.

In testimony whereof, I have hereunto signed my name.

ROBERT C. HULL.

Witnesses:
J. Lester Woodbridge,
Joseph H. Tracy.